United States Patent [19]

Dickson-Wright et al.

[11] Patent Number: 4,684,311
[45] Date of Patent: Aug. 4, 1987

[54] LOAD TRANSPORTING APPARATUS

[75] Inventors: Edward A. Dickson-Wright; Derick A. Lacey, both of Crowthorne, England

[73] Assignee: Package Control Limited, Crowthorne, England

[21] Appl. No.: 782,147

[22] Filed: Sep. 30, 1985

Related U.S. Application Data

[63] Continuation of Ser. No. 526,000, Aug. 24, 1983, abandoned.

[30] Foreign Application Priority Data

Aug. 27, 1982 [GB] United Kingdom ............... 8224718

[51] Int. Cl.⁴ .................................................. B65G 25/02
[52] U.S. Cl. ........................................ 414/535; 198/774
[58] Field of Search .......... 414/390, 391, 399, 532, 414/529, 535, 498; 193/35 SS; 198/460, 781, 782, 774; 104/134, 135, 162

[56] References Cited

U.S. PATENT DOCUMENTS

| 1,627,135 | 5/1927 | Ario | 414/498 |
| 2,693,286 | 11/1954 | Cocks | 414/535 |
| 2,828,027 | 3/1958 | Stevenson et al. | 414/349 |
| 3,011,665 | 12/1961 | Wise | 414/535 |
| 3,130,829 | 4/1964 | Long | 104/135 |
| 3,357,582 | 12/1967 | Wittek | 414/499 X |
| 3,369,684 | 2/1968 | Ford | 414/498 |
| 3,425,710 | 2/1969 | Hulverson | 104/135 X |
| 3,437,219 | 4/1969 | Stevenson, III | 414/391 |
| 3,756,544 | 9/1973 | Bader | 414/529 X |
| 4,089,399 | 5/1978 | Webb | 414/529 X |

FOREIGN PATENT DOCUMENTS

| 124416 | 9/1979 | Japan | 414/532 |
| 2133377 | 7/1984 | United Kingdom | 198/774 |

Primary Examiner—Robert J. Spar
Assistant Examiner—Stuart J. Millman
Attorney, Agent, or Firm—Gifford, Groh, VanOphem, Sheridan, Sprinkle and Dolgorukov

[57] ABSTRACT

Load transporting apparatus enables loads to be transported on and off vehicles. The apparatus requires a loading platform to be located adjacent a load receiving surface of a vehicle. The platform and the surface each have channel shaped tracks which are aligned with one another. An inflatable tube on which is carried a plate is located in the base of the channel and skates are arranged to be moved along the plates when the tube is inflated. Thus the skates can move along the channels supporting a load when a transfer to or from the vehicle is required. When in position deflation of the tube causes the skates to lower and the load rests on the associated surface. In the deflated position the skates can be moved along the tracks out of engagement with the load. The plates have a central depression to ensure that the skates remain centrally located in the tracks.

4 Claims, 5 Drawing Figures

LOAD TRANSPORTING APPARATUS

This application is a continuation of application Ser. No. 526,000, filed Aug. 24, 1983, and now abandoned.

LOAD TRANSPORTING APPARATUS

This invention relates to apparatus for transporting loads and in particular to apparatus for transporting loads on and off vehicles.

It has been proposed to load vehicles using tracks on which are located a plurality of rollers having their axes of rotation at right angles to the tracks. The load is placed on the rollers and the load can then be moved along the tracks to, for example, move the load from one position to another within the vehicle.

Hitherto a system of loading vehicles, using tracks and rollers, from outside the vehicle has proved difficult and it has not been possible to move a complete vehicle load into the vehicle in one operation. Instead it has been necessary to load individual units of the load into the vehicle using, for example, fork lift trucks.

An object of the invention is to provide apparatus suitable for loading and unloading large vehicle loads in one simple operation.

According to the invention apparatus for transporting loads on and off vehicles comprises a vehicle load receiving surface; a loading platform to be located adjacent the load receiving surface, the load receiving surface and the surface of the loading platform each having a channel-shaped elongate track length arranged thereon generally in alignment with each other, each track length containing an inflatable tube at the base of the channel and a plate movably supported on the associated tube, whereby upon inflation of the tube the plate is moved upwardly relative to the track; and a movable skate on which a load is supported for movement along the aligned track lengths to and from the load receiving surface and the loading platform, the skate having a plurality of rollers on its underside and a load-bearing surface on its upper side, the rollers being arranged to be received on the movable plates in the track length channels to selectively enable the skate to be movable along the track length, supporting a load, when the plate is moved upwardly upon inflation of the tubes, or to be movable along the track lengths independently of the load, when the plate is in a lowered position upon deflation of the tubes, the skate in the upper position of the plate being raised so that a load above the load bearing surface is engaged and lifted by the skate from the loading platform or the vehicle load receiving surface.

Preferably, the skate is formed of two or more interconnected lengths, the connection between the lengths being arranged for limited relative articulation. Articulation may be in the vertical or horizontal planes or both.

Conveniently, the skate is generally of an inverted elongate channel-section, the rollers being journalled in the upright limbs of the channel and protruding from the lower edge of said limbs, the upper side of the base of the channel defining said load-bearing surface.

It has been found that using two or more parallel tracks on the vehicle load receiving surface, and corresponding aligned tracks on the loading platform, each pair of track, having a skate or interconnected set of skates associated therewith, the entire load for a vehicle can be loaded into the vehicle in one operation from the platform. Similarly unloading can be in one operation, or if the load is capable of being subdivided into units each unit can be separately unloaded using conventional means, such as a fork lift truck.

Further features of the invention appear from the following description of an embodiment of the invention given by way of example only and with reference to the drawings, in which.

Figure 1:
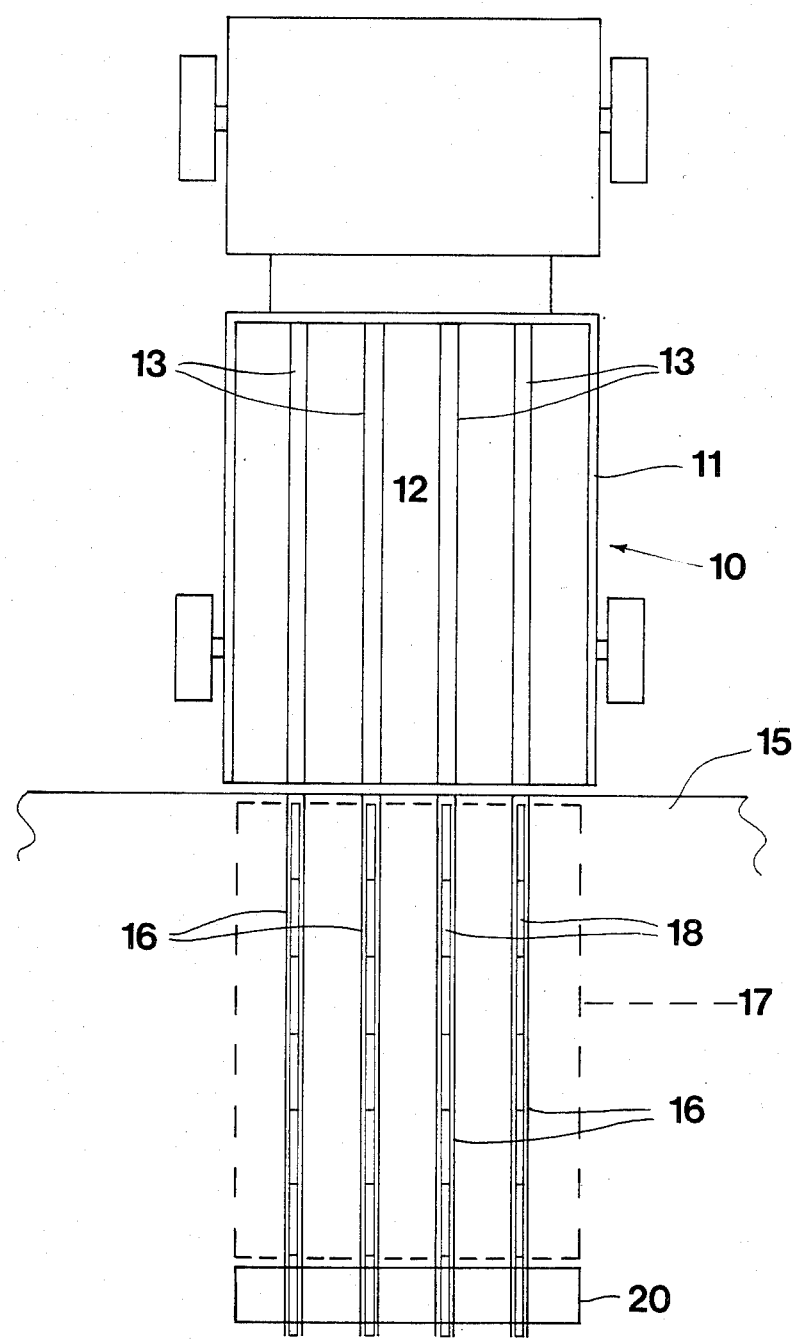
FIG. 1 is a plan view.

Referring to the drawings and firstly to FIG. 1, a vehicle 10 has a load carrying body 11 on the floor 12 of which are fitted lengths of track 13, in this case four parallel lengths 13. The rear of the vehicle has an opening through which the vehicle is loaded and the track lengths extend in the fore and aft direction of the body.

The vehicle is positioned adjacent a loading and unloading platform 15 positioned at the height of the floor 12 of the body 11. The platform 15 has lengths of track 16, corresponding in number to the lengths 13 on the body of the vehicle, and parallel to one another at the same spacings as the lengths 13. Thus, as shown, the vehicle 10 is positioned with its rear end adjacent the platform 15 and the track lengths 13 and 16 in alignment with one another.

As shown in FIG. 1 a load 17 is in position on the tracks 16 ready for transport onto the vehicle body 11. As will be described the load is positioned over a set of skates 18 provided for each arrangement of aligned tracks 13 and 16, each set of skates being located in a track length 16, as shown.

Each set of skates 18 has a length in excess of the length of the load 17, the excess length, equal to the length of one skate, is to accommodate a frame 20 to which the sets of skates 18 are attached. The frame 20 is for propelling the load into the vehicle body 11 and for ensuring the skates 18 move as one without relative longitudinal movement between the skates.

Figure 2:
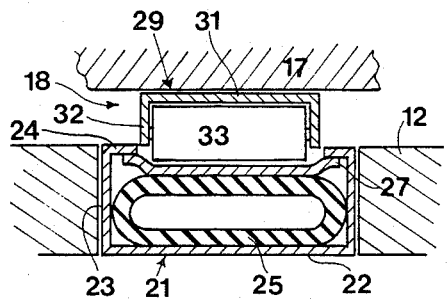
FIG. 2 is a cross-section through a track and skate in one position.
Figure 3:
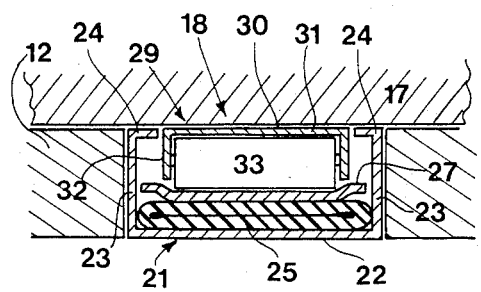
FIG. 3 is a view corresponding to FIG. 2 with the skate in another position.

Referring now to FIGS. 2 and 3 the track lengths 13 and 16 are of the same form and are each formed of channel-section members 21 having a base 22 and upright side member 23 each with a turned-over upper edge 24. Resting on the base 22 within the channel is an inflatable tube 25 which extends along the length of a track 13 or 16 from one end to the other. The tube 25 is connected to a source of compressed air to be inflated to the position of FIG. 2. When deflated the tube adopts the position shown in FIG. 3.

Resting on the tube 25 is a longitudinal plate 27 having a width such that upon inflation of the tube upward movement of the plate is restrained by engagement with the inturned edges 24. It will be seen that as the tube 25 is inflated and deflated the plate 27 is raised and lowered.

The plate 27 is profiled to provide a central depression in which the rollers 33 are received, the outer edges of the plate being upturned to provide a generally inverted hat-shaped section.

As shown in FIGS. 2 and 3 a skate 18 is located on the track length 13 or 16. The skate 18 consists of an inverted channel-section member 29, the upper surface 30 of the base 31 of which acts as a load-bearing surface for the load 17. Between the side limbs 32 of the member 29 is journalled rollers 33 whose axes extend at right angles to the longitudinal direction and at positions such that the rollers protrude below the limbs 32 of the member 29.

When the skate is in position on the tracks 13 or 16, as shown, the rollers engage the upper surface of the depressed portion of the plate 27. Depending on whether the tube is inflated or deflated the load-bearing surface 30 is above or below respectively the upper edges of the track. If the surface 30 is above the track the load 17 is engaged by the surface 30 and lifted to be supported by the skates. If the surface 30 is below th track the load is supported by the vehicle floor 12, as shown, or if the track stands proud of the floor the load is supported on the track or on supports (not shown) mounted on the floor alongside the track.

Figure 4:
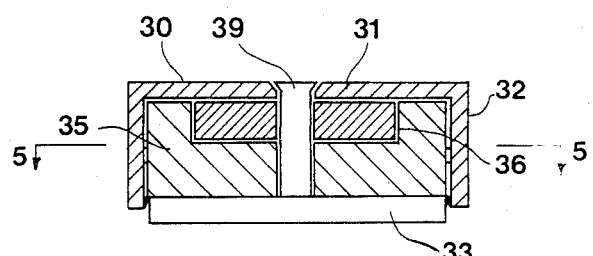
FIG. 4 is an end view of a skate.
Figure 5:
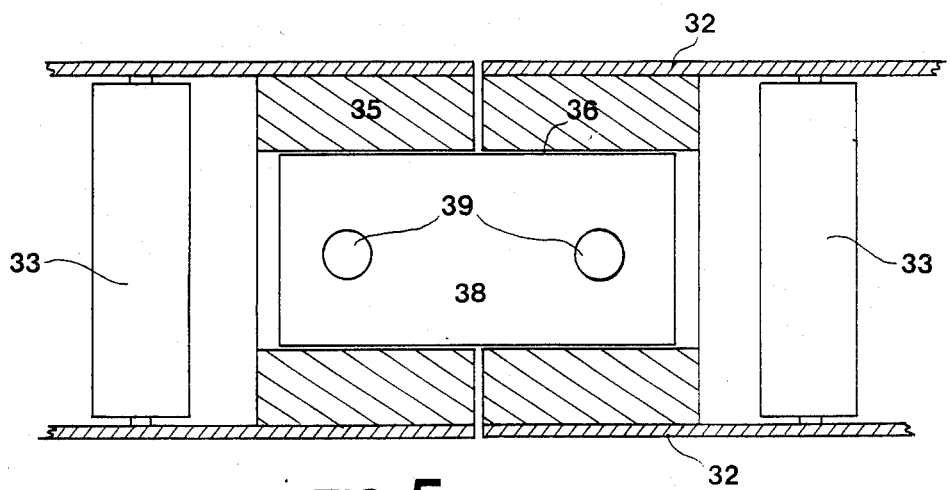
FIG. 5 is a cross-section on the line 5—5 in FIG. 4

A set of skates comprises lengths of skate, of the form shown in FIGS. 2 and 3, connected end to end and having limited articulation relative to one another. FIGS. 4 and 5 show one way in which this connection may be achieved. A block 35 is welded into each end of the channel member 29 and is formed with a slot 36 which, with the base of the member, defines an opening in which is received a rectangular-section connecting bar 38. When the skates are in end to end relationship with the bar 38 located in the respective slots the skates are secured together by screws 39 passing through holes in said base 31 into a screw threaded hole in the block 35 below the slot 36.

The bar 38 is a relatively loose fit in the slots 36 thereby providing limited articulation of adjacent skates within a set in the vertical and horizontal directions. This articulation allows for the tracks 13 and 16 not being completely straight, as will be likely to occur in practice, so that the sets of skates can follow irregularities in the track.

In use of the apparatus the platform 15 is arranged at the desired height which is at the level of the vehicle floor 12 and the height of the platform may be adjustable. The track lengths 13 on the vehicle and those 16 on the platform are aligned. The skates 18 are located on the track lengths 13 with the associated tubes 25 deflated and the load 17 is built up on the platform 15 to be of a width and height capable of being accommodated in the vehicle. The load 17 may be built up of units, such as pallets, or it may be a single unit such as a container body.

When the load is complete the tubes 25 are inflated to raise the skates and lift the load off the platform 15 onto the skates 18. Relatively little force is then required to propel the skates and load along the tracks 13 and into the vehicle. Such propulsion can be any suitable means applied to the frame 20. As soon as the load has reached its desired position wholly on the vehicle tracks 16 the associated tube 25 is deflated so that the load rests on the floor of the vehicle. The skates 18 can then be withdrawn from the tracks and repositioned in the tracks 13 for a further load to be built up.

When required to be off-loaded the reverse procedure may be followed, first positioning the sets of skates under the load and locating the vehicle adjacent a loading platform of the same form as the platform 15. Alternatively if the load is to be removed from the vehicle remote from a suitable off-loading platform, the load may be removed as individual units by means of a fork lift truck or the like, lifting the units out from the rear of the vehicle, the units each being mounted on individual skates 18.

The provision of th shaped plate 27 ensured that the skated 18 remain centrally located in the tracks and the frame 20 interconnecting the skates also ensures that the skates move together when loading and unloading the vehicle.

In order to cater for the lowering of the vehicle body on its springs under the weight of the load during loading and unloading of the vehicle, the vehicle chassis may be supported on a jack or jacks during these operations. The jacks maintain the body at the desired height in relation to the loading platform. The jacks may also be used to centralize the vehicle body in relation to the tracks.

What we claim as our invention and desire to secure by Letters Patent of the United States is:

1. Apparatus for transporting loads on and off vehicles, comprising:
   a vehicle load receiving surface;
   a loading platform to be loaded adjacent the load receiving surface;
   channel-shaped elongate track lengths on the load receiving surface and the loading platform, the track lengths being generally in alignment with one another during operation;
   an inflatable tube contained in the base of the channel of each track length;
   a plate movably supported on each tube whereby upon inflation of the tube the plate is raised relative to the associated track length;
   a movable skate comprising two or more interconnected lengths articulated relative to one another to accommodate misalignment of the track lengths, the skate supporting the load for movement along the track lengths between the load receiving surface and the loading platform;
   wherein the skate lengths each include a plurality of rollers on their underside and a load bearing surface on their upper side, the rollers being spaced and arranged to be received on the movable plate to selectively enable the skate to be movable along the track lengths supporting a load when the plate is raised upon inflation of the tube, and to be movable along the track lengths independently of the load when the plate is in a lowered position upon deflation of the tube, the load bearing surface of the skate being raised when the plate is moved to its upper position to engage and lift a load above the skate from the loading platform and from the vehicle receiving surface; and
   wherein the upper surface of the plate receiving the rollers being profiled to provide a central longitudinal depression with upwardly inclined side portions whereby the location of the skate on the plate is self-centering and the skate is inhibited from engaging the track lengths.

2. Apparatus according to claim 1 wherein the skate is of an inverted channel shape in transverse section, the rollers being journalled in the upright limbs of the channel and protruding from the lower edge of said limbs, the upper side of the base of the channel defining said load bearing surface.

3. Apparatus according to claim 1 including two or more parallel tracks on the vehicle load receiving surface and corresponding aligned tracks on the loading platform, and a skate for each associated set of aligned tracks.

4. Apparatus according to claim 1 wherein the plate is held captive in the channels of the track lengths by the outer, lateral edges of the plate locating against inwardly-directed lips at the sides of the channels in the raised position of the plate.

* * * * *